United States Patent
Horschel et al.

(10) Patent No.: US 10,584,764 B1
(45) Date of Patent: Mar. 10, 2020

(54) TORSIONAL VIBRATION DAMPER AND METHOD OF MAKING A TORSIONAL VIBRATION DAMPER

(71) Applicant: Horschel Brothers Precision LLC, Springville, NY (US)

(72) Inventors: Karl G. Horschel, Springville, NY (US); Aaron J. Neyman, Collins, NY (US)

(73) Assignee: Horschel Brothers Precision LLC, Springville, NY (US)

( * ) Notice: Subject to any disclaimer, the term of this patent is extended or adjusted under 35 U.S.C. 154(b) by 0 days.

(21) Appl. No.: 16/280,645

(22) Filed: Feb. 20, 2019

Related U.S. Application Data (60) Provisional application No. 62/644,881, filed on Mar. 19, 2018.

(51) Int. Cl.
F16F 15/173 (2006.01)

(52) U.S. Cl.
CPC .................................. F16F 15/173 (2013.01)

(58) Field of Classification Search
CPC ..................................................... F16F 15/173
See application file for complete search history.

(56) References Cited

U.S. PATENT DOCUMENTS

| | | | | |
|---|---|---|---|---|
| 3,512,612 A | * | 5/1970 | Bragg | F16F 15/173 188/378 |
| 3,555,926 A | * | 1/1971 | Moorhouse | F16F 15/173 74/573.1 |
| 3,771,380 A | * | 11/1973 | Bahr | F16F 15/173 74/573.1 |
| 4,344,740 A | | 8/1982 | Trenschel et al. | |
| 4,953,778 A | | 9/1990 | Critton et al. | |
| 5,058,453 A | * | 10/1991 | Graham | F16F 15/173 188/379 |
| 5,165,305 A | * | 11/1992 | Veronesi | F04D 13/02 219/117.1 |
| 6,913,538 B2 | | 7/2005 | Tabuchi et al. | |
| 9,435,397 B2 | | 9/2016 | Aijima et al. | |
| 2011/0048877 A1 | * | 3/2011 | Geislinger | F16F 15/173 188/277 |
| 2017/0248219 A1 | | 8/2017 | Kvasnicka et al. | |

* cited by examiner

Primary Examiner — Vicky A Johnson
(74) Attorney, Agent, or Firm — David L. Principe; Phillips Lytle LLP (57) ABSTRACT

A viscous torsional vibration damper of the kind operating on the shear film principle has an annular shaped housing providing an annular working chamber within which is mounted an annular complementary inertia mass ring and a viscous damping fluid substantially fills shear film spaces between the working surfaces of the inertia ring and confronting working surfaces of the housing within the chamber. The cover has one or more lugs extending from the outside of an axially extending wall that engage with lugs inside the housing near the bottom wall. Rotation of the cover relative to the housing causes an axial force through the lugs that forces the cover into sealing engagement with the housing.

20 Claims, 8 Drawing Sheets

TORSIONAL VIBRATION DAMPER AND METHOD OF MAKING A TORSIONAL VIBRATION DAMPER

CROSS-REFERENCE TO RELATED APPLICATION

The present application claims priority benefit of U.S. Provisional Patent Application No. 62/644,881 filed on Mar. 19, 2018, and entitled "Torsional Vibration Damper and Method of Making a Torsional Vibration Damper," which is hereby incorporated by reference.

TECHNICAL FIELD

The present invention relates generally to improvements in viscous torsional vibration dampers and to a method of making a torsional vibration damper.

BACKGROUND ART

Viscous torsional vibration dampers provide a housing defining an axially opening annular working chamber. A complementary annular inertia mass ring is disposed inside the working chamber defined in the housing. A cover is sealed across the axial opening of the housing for confining the inertia ring within the annular working chamber. Opposed surfaces of the inertia ring and the housing are in shear film, spaced relation and a viscous damping fluid substantially fills the spaces between the inner walls of the housing and the inertia ring. A hub may be attached to the viscous torsional vibration damper for connecting the damper to a crankshaft. The cover that seals across the annular, axial opening of the housing may be attached to the housing by welding or it may be bolted onto the housing. Both of these methods of forming the torsional damper have drawbacks. Welding creates a permanent attachment of the cover to the housing and prevents disassembly and rebuilding without destruction. Welding may introduce thermal distortion. Also, welding requires the use of similar materials for the housing and the cover. Attaching the cover by means of threaded fasteners requires thicker materials which runs counter to the goal to reduce weight in high performance applications.

SUMMARY OF THE INVENTION

The present invention meets the above described need by providing a torsional vibration damper having an annular shaped housing (28) defining an annular working chamber. The housing (28) has a central bore (59) defined therein. The housing (28) has an axis of rotation (29) disposed through the center of the bore (59). The housing (28) has a raised surface (62) surrounding the central bore (59). The raised surface (62) has one or more openings (71) defined therein. The housing (28) has a first axially extending wall (65) disposed between the raised surface (62) and a bottom wall (60) of the housing (28). The housing (28) has a second axially extending wall (80) disposed at the perimeter of the housing (28). The second axially extending wall (80) has at least one lug (86) extending inward therefrom in the radial direction. The at least one lug (80) is tapered in a first direction.

A cover (10) has a top surface (13) with a central bore (16) defined therein. The top surface (13) has one or more openings (25) defined therein. The one or more openings (25) are configured and arranged to align with the one or more openings (71) in the raised surface (62) of the housing (28) such that at least one fastener may be inserted into the one or more openings (25, 71) to attach the cover (10) to the housing (28). The cover (10) has a first axially extending wall (19) disposed at the perimeter of the top surface (13). They first axially extending wall (19) has at least one lug (47) disposed toward the bottom of the first axially extending wall (19). The lug (47) is tapered in a second direction opposite from the first direction of the lug (86) on the housing (28).

The cover (10) is configured and arranged to be mounted on the housing (28) by pressing the cover (10) onto the housing (28) and rotating the cover (10) such that the at least one lug (47) on the cover slides under the at least one lug (86) on the housing (28). The at least one lug (47) on the cover (10) frictionally engages with the bottom surface of the at least one lug (86) on the housing (28) due to the tapering of the lugs (47, 86) in the first and second direction. An annular inertia mass ring is disposed inside the housing (28). A viscous damping media substantially fills shear film spaces between the working surfaces of the inertia ring and confronting working surfaces of the housing (28) within the chamber.

The cover (10) may be provided with a first channel (50) for receiving an O-ring for sealing the cover (10) against the annular raised surface (62) of the housing (28). An elastomeric seal in the form of an O-ring may be disposed in the first channel (50).

The cover (10) may be provided with a second channel (53) disposed around its perimeter for sealing the bottom edge of the cover (10) against the bottom wall (60) of the housing (28). An elastomeric seal in the form of an O-ring may be disposed in the second channel (53).

The top surface (13) of the cover (10) may be provided with a plurality of timing marks (22) disposed thereon.

The cover (10) may be provided with a plurality of second openings (31) configured and arranged for mounting a hub thereon.

The cover (10) may further comprise a locating hole (34).

The viscous damping media disposed in the chamber of the housing may comprise a silicone fluid.

The lugs (47, 86) are tapered from a first width at a first end to a second smaller width at a second end.

The housing (28) has a locating hole (77) on the raised surface (62).

Rotation of the cover (10) relative to the housing (28) with the lugs (47, 86) engaged causes an axial force on the cover (10) toward the housing (28) such that the cover (10) is sealed against the housing (28).

A first seal may be formed against the raised surface (62).

A second seal may be formed between the bottom of the cover (10) and the bottom wall (60) of the housing (28).

Rotation of the cover (10) relative to the housing (28) brings the locating hole (34) on the cover (10) into alignment with the locating hole (77) on the housing (28) so that a locking pin can be inserted into the locating holes (34, 77) to maintain the position of the cover (10) relative to the housing (28) when the engagement of the lugs (47, 86) causes the axially extending wall (19) on the cover (10) to be forced into engagement with the bottom wall (60) of the housing (28).

The housing (28) has an opening (99) in the bottom wall (60) for receiving damping fluid.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Figure 1:
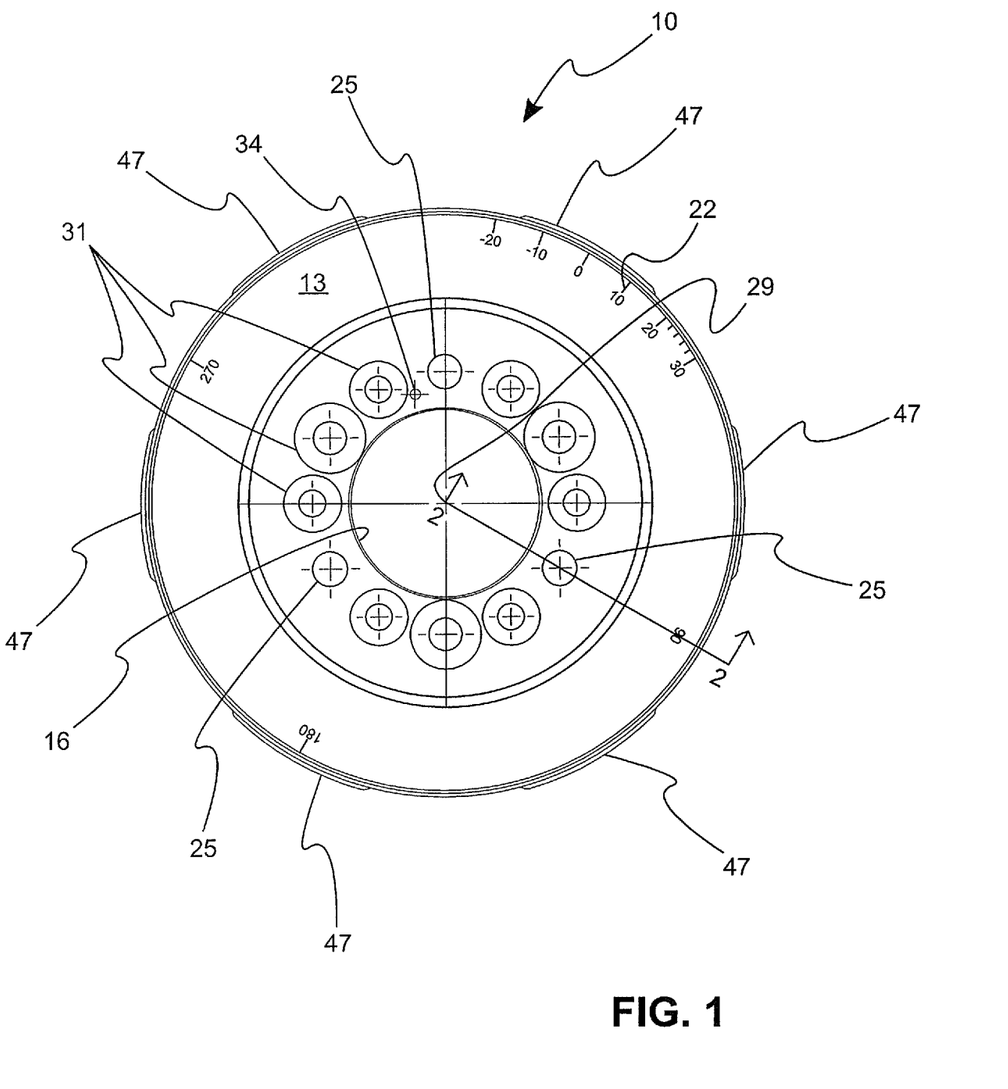
FIG. 1 is a top plan view of the cover of the present invention.
Figure 2:
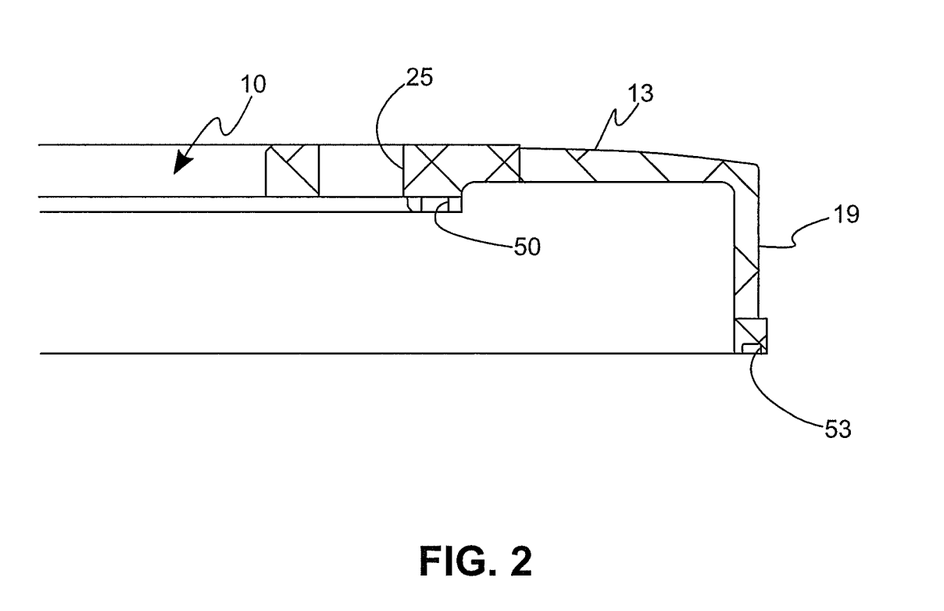
FIG. 2 is a cross-sectional view taken along lines 2-2 of FIG. 1.
Figure 3:
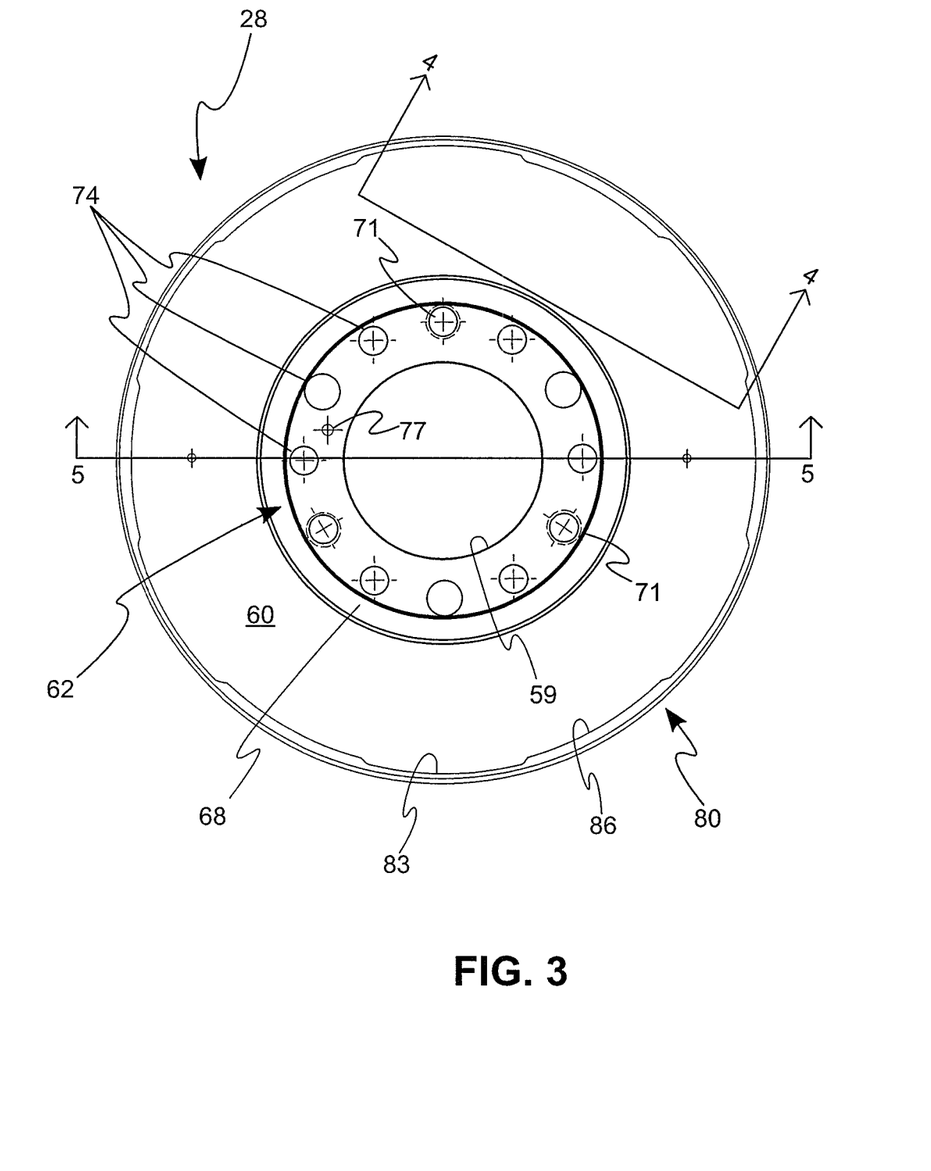
FIG. 3 is a top plan view of the housing of the present invention.

Referring generally to FIGS. 1-8 and initially to FIG. 1, a cover 10 has a round overall shape with a top surface 13 having a bore 16 defined at the center thereof. The top surface 13 extends to a curved side wall 19 (FIG. 2). The top surface 13 may be provided with a plurality of timing marks 22. Surrounding the central bore 16, a plurality of first openings 25 are defined in the cover 10 for receiving fasteners to attach the cover 10 to the housing 28 (FIG. 3). The center of the bore 16 defines an axis of rotation 29 for the torsional vibration damper. A plurality of second openings 31 may be provided for mounting a hub (not shown) which attaches the torsional vibration damper to a crankshaft (not shown). A locating hole 34 is defined in the top surface 13 of the cover 10. A plurality of tapered lugs 47 protrude from the outside bottom portion of the side wall 19.

Turning to FIG. 2, a first channel 50 receives an elastomeric seal for sealing between the cover 10 and the housing 28. A second channel 53 along the bottom of the sidewall 19 also receives an elastomeric seal for sealing between the cover 10 and the housing 28.

Figure 4:
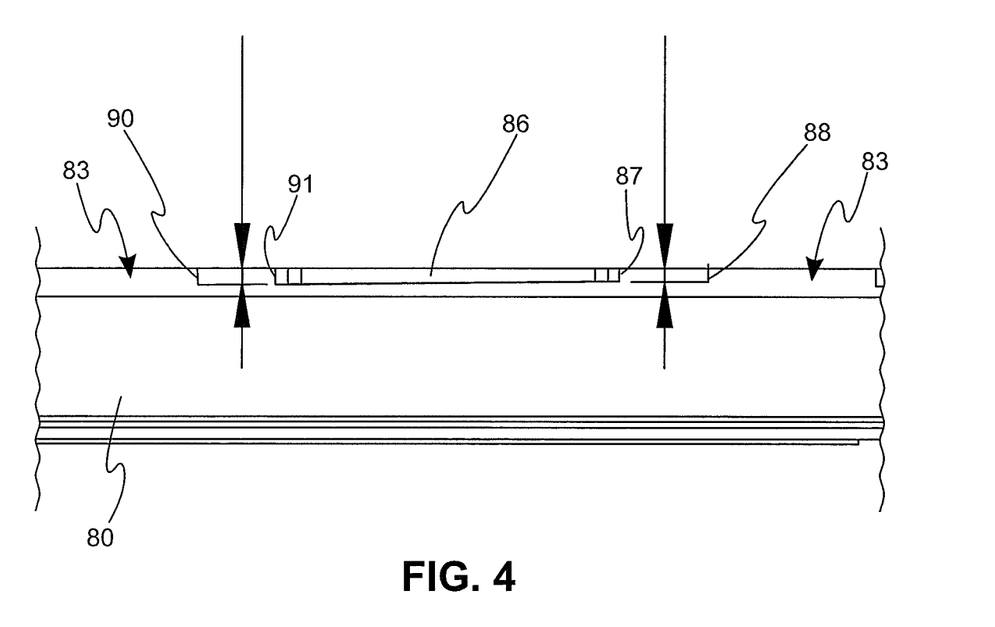
FIG. 4 is an enlarged cross-sectional view taken along lines 4-4 of FIG. 3.
Figure 5:
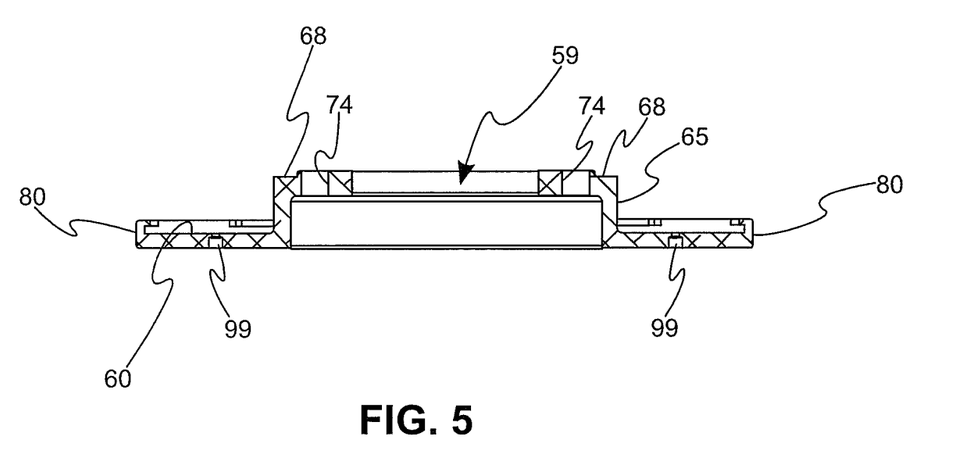
FIG. 5 is a cross-sectional view taken along lines 5-5 of FIG. 3.

In FIGS. 3-5, the housing 28 is designed to receive the cover 10 to form an annular working chamber 56 (shown in FIG. 8) that receives the inertia ring and the viscous damping media which may comprise a silicone fluid. The housing 28 has a central bore 59 defined therein that corresponds to the central bore 16 in the cover 10. A bottom wall 60 forms a portion of the working chamber 56.

A surface 62 is disposed above and in spaced apart relation to the bottom wall 60. An axially extending wall 65 (FIG. 5) is disposed between the bottom wall 60 and the surface 62. A portion 68 (FIG. 5) of the surface 62 provides an area for sealing engagement with the elastomeric seal disposed in channel 50 on the cover 10. As shown in FIG. 3, the surface 62 is provided with a plurality of first openings 71 that receive fasteners disposed through openings 25 in cover 10. A plurality of second openings 74 align with openings 31 when the cover 10 is attached to the housing 28. Locating hole 77 receives a locking pin through opening 34 when the cover 10 is attached to the housing 28 and openings 34 and 77 are brought into alignment as described below.

The outer perimeter of the housing 28 includes an axially extending side wall 80 (FIG. 5) that extends from bottom wall 60. A plurality of openings 83 (best shown in FIG. 3) are formed at the top of the side wall 80 for receiving the lugs 47 on the outside of the cover 10.

Turning to FIG. 4, a plurality of lugs 86 extend inwardly at the top of the side wall 80 on opposite sides of openings 83. The lugs 86 are tapered from a first end 87 having a width 88 that is smaller than a width 90 at a second end 91 as shown in FIG. 4.

Figure 6:
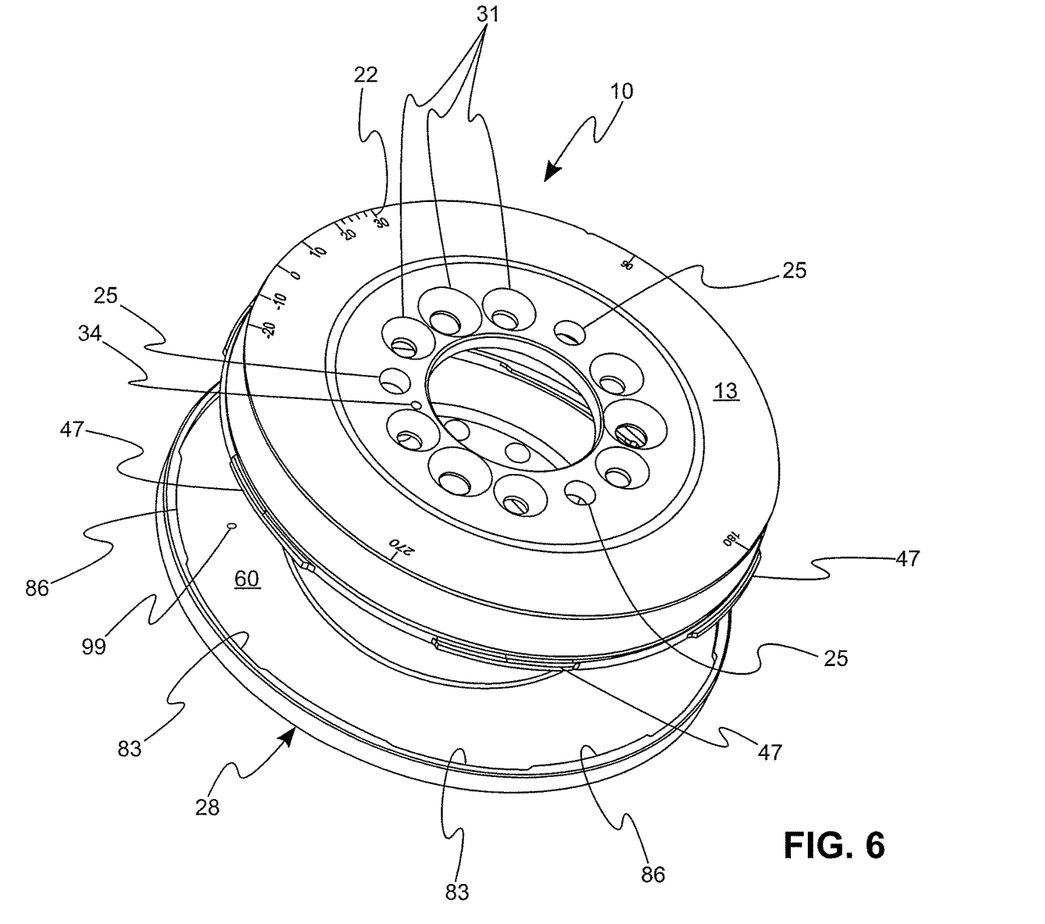
FIG. 6 is a perspective view showing the cover prior to mounting on the housing.
Figure 7:
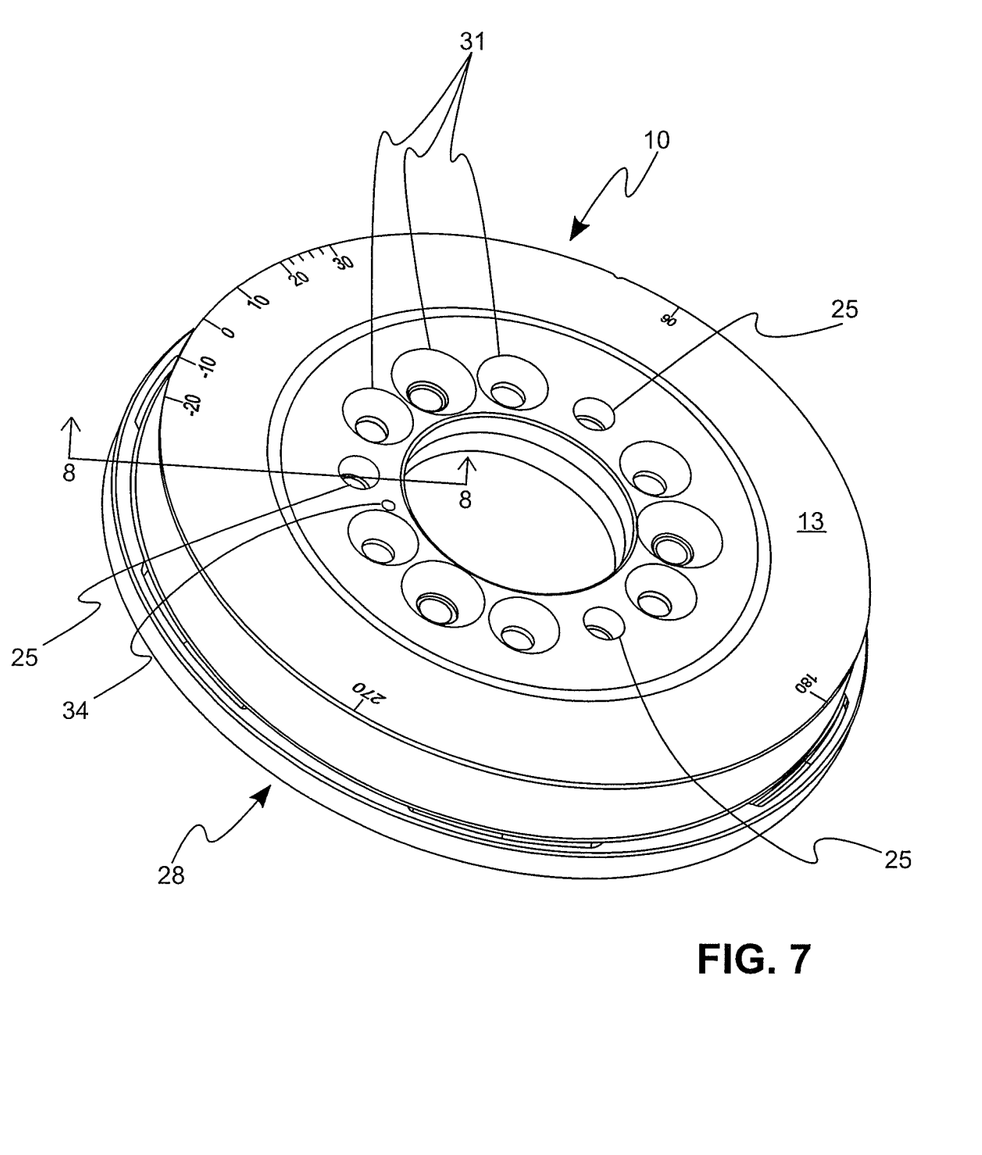
FIG. 7 is a perspective view showing the cover mounted to the housing.
Figure 8:
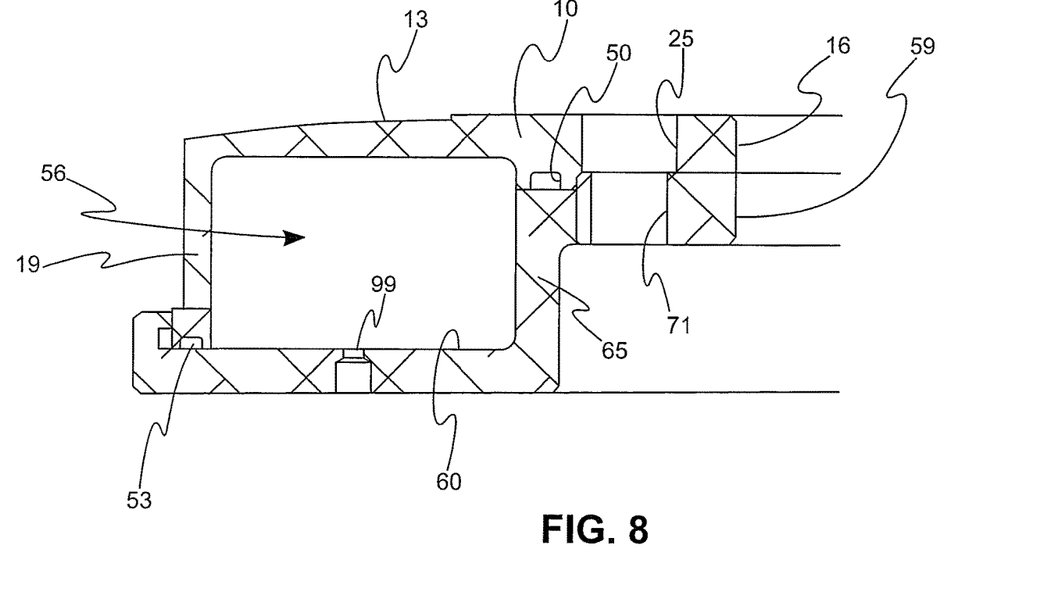
FIG. 8 is a cross sectional view taken along lines 8-8 of FIG. 7.

Turning to FIGS. 6-8, the cover 10 is installed by inserting the cover 10 into the housing 28 in the axial direction (normal to the page with respect to FIG. 3) with the lugs 47 on the outside of cover 10 aligned with openings 83. The lugs 47 taper in the opposite direction from lugs 86. After the lugs 47 are inserted through openings 83, rotation of the cover 10 relative to the housing 28 causes the cooperating surfaces on lugs 47 and 86 to engage causing a compressive force in the axial direction. Rotation of the cover 10 for approximately thirty degrees causes an axial force between the cover 10 and housing 28 that is sufficient to compress the elastomeric seals to seal the working chamber 56 and brings the locating holes 34, 77 into alignment. After the locking pin is inserted to fix the relative position, the cover 10 is attached to the housing 28 by means of fasteners. Opening 99 (FIG. 8) provides for filling the chamber with damping fluid such as silicone.

The present invention contemplates that many changes and modifications may be made. Therefore, while the presently-preferred form of the torsional vibration damper has been shown and described, persons skilled in this art will readily appreciate that various additional changes and modifications may be made without departing from the spirit of the invention.

What is claimed is:

1. A torsional vibration damper, comprising:
a housing defining an annular working chamber, the housing having a central bore defined therein, the housing having an axis of rotation disposed through the center of the bore, the housing having a raised surface surrounding the central bore, the raised surface having a plurality of first openings defined therein, the housing having a first axially extending wall disposed between the raised surface and a bottom wall of the housing, the housing having a second axially extending wall disposed at the outer perimeter of the housing, the second axially extending wall having a plurality of lugs extending therefrom, each lug disposed in spaced apart relation with successive lugs along an arc, the lugs being tapered in a first direction;
a cover having a top surface with a central bore defined therein, the top surface having a plurality of openings defined therein, the openings configured and arranged to align with the openings in the raised surface of the housing such that fasteners may be inserted into the openings to attach the cover to the housing, the cover having a first axially extending wall disposed at the perimeter of the top surface, the first axially extending wall having a plurality of lugs extending therefrom, each lug disposed in spaced apart relation with successive lugs along an arc, the lugs being tapered in a second direction opposite from the first direction of the lugs on the housing;

wherein the cover is configured and arranged to be mounted on the housing such that the lugs on the cover are received between the lugs on the housing and the cover is configured and arranged such that when the cover is rotated the lugs on the cover slide into frictional engagement with the lugs on the housing due to the tapering of the lugs in the first and second direction;

an inertia mass ring disposed inside the housing; and, a viscous damping media substantially filling shear film spaces between working surfaces of the inertia ring and confronting working surfaces of the housing within the chamber.

2. The damper of claim 1, wherein the cover has a first channel for receiving an O-ring for sealing the cover against the raised surface of the housing.

3. The damper of claim 2, further comprising an elastomeric seal disposed in the first channel.

4. The damper of claim 1, wherein the cover has a second channel disposed around its perimeter for sealing the bottom edge of the cover against the bottom wall of the housing.

5. The damper of claim 4, further comprising an elastomeric seal disposed in the second channel.

6. The damper of claim 1, wherein the top surface of the cover has a plurality of timing marks disposed thereon.

7. The damper of claim 1, wherein the cover has a plurality of second openings configured and arranged for mounting a hub thereon.

8. The damper of claim 1, wherein the cover further comprises a locating hole.

9. The damper of claim 8, wherein the housing has a locating hole on the raised surface.

10. The damper of claim 1, wherein the viscous damping media is a silicone fluid.

11. The damper of claim 1, wherein the lugs are tapered from a first width at a first end to a second smaller width at a second end.

12. The damper of claim 1, wherein the rotation of the cover relative to the housing with the lugs engaged causes an axial force on the cover toward the housing such that the cover is sealed against the housing.

13. The damper of claim 12, wherein a first seal is formed against the raised surface.

14. The damper of claim 13, wherein a second seal is formed between the bottom of the cover and the bottom wall of the housing.

15. The damper of claim 1, wherein the rotation of the cover relative to the housing brings the locating hole on the cover into alignment with the locating hole on the housing so that a locking pin can be inserted into the locating holes to maintain the position of the cover relative to the housing when the engagement of the lugs causes the axially extending wall on the cover to be forced into engagement with the bottom wall of the housing.

16. The damper of claim 1, wherein the housing has an opening in the bottom surface for receiving viscous damping media.

17. A torsional vibration damper, comprising:

an annular shaped housing defining an annular working chamber, the housing having a central bore defined therein, the housing having an axis of rotation disposed through the center of the bore, the housing having a raised surface surrounding the central bore, the raised surface having one or more openings defined therein, the housing having a first axially extending wall disposed between the raised surface and a bottom wall of the housing, the housing having a second axially extending wall disposed at the perimeter of the housing, the second axially extending wall having at least one lug extending therefrom in the radial direction, the at least one lug being tapered in a first direction;

a cover having a top surface with a central bore defined therein, the top surface having one or more openings defined therein, the opening configured and arranged to align with the one or more openings in the raised surface of the housing such that at least one fastener may be inserted into the one or more openings to attach the cover to the housing, the cover having a first axially extending wall disposed at the perimeter of the top surface, the first axially extending wall having at least one lug disposed toward the bottom of the first axially extending wall, the lug being tapered in a second direction opposite from the first direction of the lug on the housing;

wherein the cover is configured and arranged to be mounted on the housing by pressing the cover onto the housing and rotating the cover such that the at least one lug on the cover slides under the at least one lug on the housing such that the at least one lug on the cover frictionally engages with the bottom surface of the at least one lug on the housing due to the tapering of the lugs in the first and second direction;

an inertia mass ring disposed inside the housing;

a viscous damping media substantially filling shear film spaces between working surfaces of the inertia ring and confronting working surfaces of the housing within the chamber;

a first seal disposed between the cover and the raised surface; and, a second seal disposed between the cover and the bottom wall of the housing.

18. The damper of claim 17, wherein the cover has a first channel for receiving an O-ring for sealing the cover against the annular raised surface of the housing.

19. The damper of claim 17, wherein the cover has a second channel disposed around its perimeter for sealing the bottom edge of the cover against the bottom wall of the housing.

20. A method of making a viscous torsional vibration damper, the method comprising:

providing a housing, defining an annular working chamber, the housing having a central bore defined therein, the housing having an axis of rotation disposed through the center of the bore, the housing having a raised surface surrounding the central bore, the raised surface having one or more openings defined therein, the housing having a first axially extending wall disposed between the raised surface and a bottom wall of the housing, the housing having a second axially extending wall disposed at the perimeter of the housing, the second axially extending wall having at least one lug extending therefrom in the radial direction, the at least one lug being tapered in a first direction;

providing a cover having a top surface with a central bore defined therein, the top surface having one or more openings defined therein, the opening configured and arranged to align with the one or more openings in the raised surface of the housing such that at least one fastener may be inserted into the one or more openings to attach the cover to the housing, the cover having a first axially extending wall disposed at the perimeter of the top surface, the first axially extending wall having at least one lug extending therefrom, the lug being tapered in a second direction opposite from the first direction of the lug on the housing;

inserting an inertia mass ring inside the housing;

mounting the cover on the housing by pressing the cover onto the housing and rotating the cover such that the at least one lug on the cover slides into frictional engagement with the at least one lug on the housing due to the tapering of the lugs in the first and second direction; and, filling the working chamber with a viscous damping media substantially filling shear film spaces between working surfaces of the inertia ring and confronting working surfaces of the housing within the chamber.

\* \* \* \* \*